(No Model.)
W. F. WHITE.
RAILWAY TICKET.
No. 594,976. Patented Dec. 7, 1897.
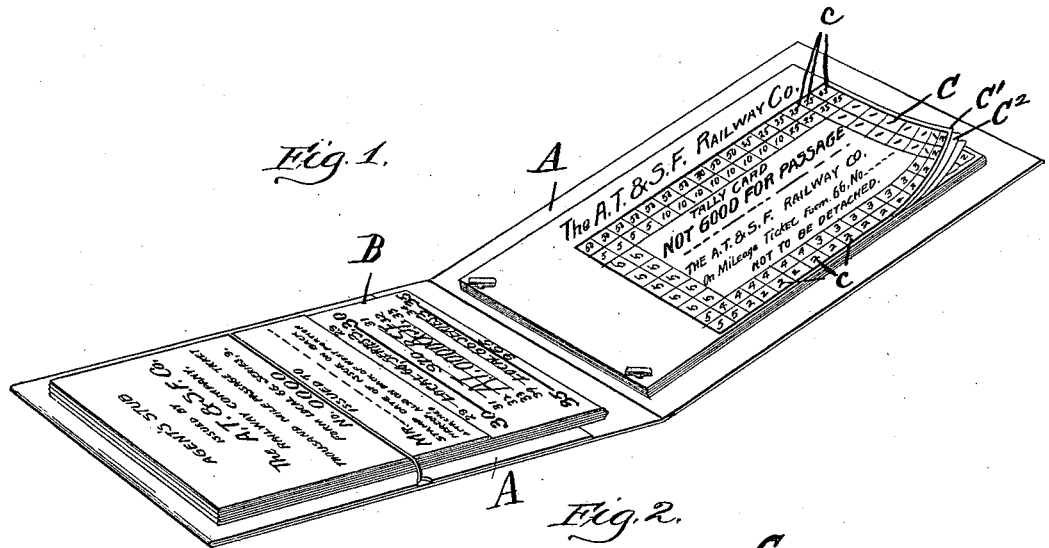
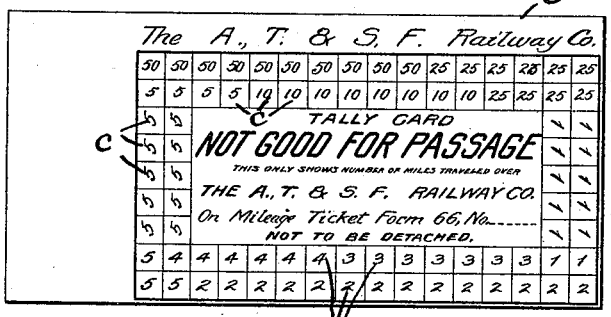
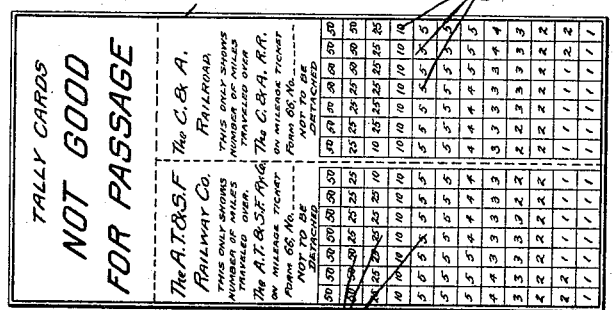
Witnesses
Martin H. Olsen
J. Cross.
Inventor
William F. White
By Cualey & Hopkins
His Attorneys

UNITED STATES PATENT OFFICE.

WILLIAM F. WHITE, OF HIGHLAND PARK, ILLINOIS, ASSIGNOR TO GEORGE M. SHOLL, OF CHICAGO, ILLINOIS.

RAILWAY-TICKET.

SPECIFICATION forming part of Letters Patent No. 594,976, dated December 7, 1897.

Application filed September 10, 1897. Serial No. 651,222. (No model.)

*To all whom it may concern:*

Be it known that I, WILLIAM F. WHITE, a citizen of the United States, residing at Highland Park, in the county of Lake and State of Illinois, have invented certain new and useful Improvements in Railway-Tickets, of which the following is a specification.

The present invention relates to railway-tickets of the class known as "mileage-tickets." Such a ticket usually consists of a stub or cover, upon which is printed the conditions under which the ticket is issued, or, in other words, the contract between the company or companies over whose road the ticket reads and the purchaser or holder, and a long strip of coupons, each representing a fractional part of the total number of miles for which the ticket is good for transportation. These tickets are frequently good for transportation over the roads of two or more companies, and the practice is for each conductor to whom the ticket is presented to detach coupons representing the distance traveled over the road of the company he represents. The coupons so detached are sent by the conductor to the auditor of his company, and when the ticket is issued by a company other than his these coupons are used as vouchers representing the compensation which the company collecting them is to receive from the company that issued the ticket. Should the coupons so collected be lost or destroyed or not turned in by the conductor collecting them, his company is without any knowledge that the holder of the ticket has traveled over its road and without any evidence that it is entitled to compensation for such travel from the company that issued the ticket.

The object of the present invention is to provide a mileage-ticket having means for insuring that when used according to directions each and every company over whose road it reads and is used shall receive from the issuing company its due proportion of the consideration for which the ticket was issued. To this end I associate with a mileage-ticket of customary character record-blanks, upon which the conductor of each company over whose road the ticket is used may make a record of the number of miles so traveled by the holder and for which he has detached coupons. The blank on which this record is to be made is associated with the stub or cover, and the contract provides for a rebate to be paid when the cover, with its record intact, is turned in to the company issuing the ticket. A separate blank is provided for each company over whose road the ticket reads. It is not necessary that a physically separate and independent card or slip be provided for the record-blank of each company, and whenever it is herein stated that the blanks are separate, unless the contrary is made to appear, it means simply that they are separate to the extent that there is a defined or apportioned place or space or part on which the conductor of each company may make the record for his company. Preferably, however, each blank is on a separate slip, and the several slips are permanently associated with the cover. The several record-blanks have printed upon them the names of the companies for which they are respectively provided, and each may bear the inscription "Tally-card" or "Record-blank" or any other inscription indicating its object, together with instructions for its use, albeit these instructions may, if desired, be on some other part of the ticket. In addition each blank bears numbers representing fractional parts of the total number of miles for which the ticket is good for transportation, and preferably the sum of all of these numbers is the total number of miles aforesaid. For example, if the ticket is good for a thousand miles it may bear the numbers "50" and "25," each repeated ten times; the number "10" repeated eight times; "5," seventeen times; "4," six times; "3," seven times; "2," fourteen times, and "1" twelve times, these numbers being so disposed that they may be punched out.

Let it be supposed that the ticket is issued by, say, the A., T., and S. F. and reads over it and, say, two others—the C., B., and Q. and the C. and A. It is presented on the A., T., and S. F. for passage over seventy-five miles. The conductor tears off coupons representing this distance and punches out of the record-blank provided for the A., T., and S. F. numbers aggregating seventy-five. It is next presented on the C., B., and Q. for passage over one hundred miles. The conductor tears off coupons representing one hundred miles and punches out of the record-blank provided for the C., B., and Q. numbers aggregating one hundred, and so on, each time the ticket is presented, until its last coupon is taken up, whereupon the stub or cover and the accompanying records so made by the conductors are returned to the holder, and by him they are, in consideration of the rebate provided for in the contract, returned to the company that issued the ticket. The company then has a complete record of its indebtedness to the other companies over whose roads the ticket was used, and the danger of loss to these latter companies by reason of their failure to receive and turn over to the issuing company the coupons by them collected is entirely avoided. The accounting between the companies may be made upon the coupons if they are turned in or upon the records if the coupons are missing.

I believe myself to be the first to provide a railway-ticket of this character, and I therefore desire to have it understood that my invention is not limited to the minor details in the character of the blank or blanks on which the conductors' records are made, and any device or devices which will enable the conductors of the several companies to make a record such as described, which record accompanies the stub or cover of the ticket, is within the scope of the invention, albeit, as before stated, I prefer to use for each blank a separate slip or a piece adapted to be divided up into separate parts, so that they may ultimately be sent to the auditors of their respective companies.

In the accompanying drawings, which are made a part of this specification, Figure 1 is a perspective view of a ticket embodying the invention in its preferred form. Fig. 2 is a detail view of one of the record-blanks. Fig. 3 is a detail view of two record-blanks made on a single slip.

A represents the stub or cover, on which preferably are printed the conditions of sale and use, the instructions for the guidance of the officers of the company or companies and the purchaser or holder, and such other matter as may be deemed appropriate or desirable.

B is the strip of coupons, each representing a fractional part of the total number of miles for which the ticket is good for transportation and which are to be detached by the conductors and sent to their respective auditors.

C C', &c., are the record-blanks. Preferably each blank is printed on a separate slip of paper, and the several slips are secured to the stub or cover, so as to be and remain with it until it is returned for settlement, after which they may be detached and sent to the companies which they respectively represent. Each of them bears the number and description of the ticket which it accompanies and numbers $c$ representing fractional parts of the total number of miles for which the ticket is good for transportation. Each bears also the name of one of the companies over whose roads the ticket reads, the words "Tally-card" or the like, "Not good for passage," and such other matter as may be deemed appropriate or desirable. More than one record-blank may, however, be printed on the same slip, as shown in Fig. 3.

Having thus described my invention, the following is what I claim as new therein and desire to secure by Letters Patent:

1. As a new article of manufacture, a mileage-ticket good for transportation over more than one road and bearing coupons representing fractional parts of the total number of miles for which the ticket is good for transportation, a stub or cover, and a separate record-blank for each road over which the ticket is good, substantially as set forth.

2. As a new article of manufacture, a mileage-ticket good for transportation over more than one road and bearing coupons representing fractional parts of the total number of miles for which the ticket is good for transportation, a stub or cover, and a separate record-blank for each road over which the ticket is good for transportation, said record-blanks being attached to the stub or cover, substantially as set forth.

3. As a new article of manufacture, a mileage-ticket good for transportation over more than one road and bearing coupons representing fractional parts of the total number of miles for which the ticket is good for transportation, a stub or cover, and a separate record-blank for each road over which the ticket is good, each of said blanks being provided with numbers representing fractional parts of the total number of miles aforesaid, substantially as set forth.

4. As a new article of manufacture, a mileage-ticket good for transportation over more than one road and bearing coupons representing fractional parts of the total number of miles for which the ticket is good for transportation, a stub or cover, and separate record-blanks bearing the names, respectively, of the roads over which the ticket is good for transportation, substantially as set forth.

5. As a new article of manufacture, a mileage-ticket good for transportation over more than one road and bearing coupons representing fractional parts of the total number of miles over which the ticket is good for transportation, a stub or cover, and separate record-blanks bearing the names of the roads over which the ticket is good for transportation, respectively, each blank bearing also numbers representing fractional parts of the total number of miles for which the ticket is good for transportation, substantially as set forth.

6. As a new article of manufacture, a mileage-ticket good for transportation over more than one road and bearing coupons representing fractional parts of the total number of miles for which the ticket is good for transportation, a stub or cover, and separate record-blanks for the roads over which the ticket is good for transportation, respectively, each blank being on a separate slip and all of said slips being attached to the stub or cover, substantially as set forth.

WILLIAM F. WHITE.

Witnesses:
W. H. SIMPSON,
JNO. REID.